United States Patent
Gundavelli et al.

(10) Patent No.: US 12,452,701 B2
(45) Date of Patent: Oct. 21, 2025

(54) DUAL MODE WI-FI OPERATION IN SHARED AND NON-SHARED CHANNELS

(71) Applicant: Cisco Technology, Inc., San Jose, CA (US)

(72) Inventors: Sri Gundavelli, San Jose, CA (US); Arun G. Khanna, Sunnyvale, CA (US); Indermeet Singh Gandhi, San Jose, CA (US); Mark Grayson, Berkshire (GB); Pascal Thubert, Roquefort les Pins (FR)

(73) Assignee: Cisco Technology, Inc., San Jose, CA (US)

( * ) Notice: Subject to any disclaimer, the term of this patent is extended or adjusted under 35 U.S.C. 154(b) by 687 days.

(21) Appl. No.: 17/836,235

(22) Filed: Jun. 9, 2022

(65) Prior Publication Data

US 2023/0362675 A1   Nov. 9, 2023

Related U.S. Application Data

(60) Provisional application No. 63/338,966, filed on May 6, 2022.

(51) Int. Cl.
*H04W 24/02* (2009.01)
*H04W 40/24* (2009.01)
(Continued)

(52) U.S. Cl.
CPC ......... *H04W 24/02* (2013.01); *H04W 40/246* (2013.01); *H04W 76/10* (2018.02); *H04W 84/12* (2013.01); *H04W 88/10* (2013.01)

(58) Field of Classification Search
CPC ... H04W 24/02; H04W 40/246; H04W 76/10; H04W 84/12; H04W 88/10
See application file for complete search history.

(56) References Cited

U.S. PATENT DOCUMENTS

| 2008/0132239 A1 | 6/2008 | Khetawat et al. |
| 2013/0016032 A1 | 1/2013 | Margulis |

(Continued)

FOREIGN PATENT DOCUMENTS

| EP | 3211943 A1 | 8/2017 |
| WO | 2015126960 A1 | 8/2015 |
| WO | 2016011011 A1 | 1/2016 |

OTHER PUBLICATIONS

International Search Report and Written Opinion for International Application No. PCT/US2023/020451, mailed Jul. 5, 2023, 17 Pages.

*Primary Examiner* — Brian P Cox
(74) *Attorney, Agent, or Firm* — Polsinelli P.C.

(57) ABSTRACT

The present disclosure relates to simultaneous operation of Wi-Fi access points in a super cell mode and a standalone mode and controlling connectivity of end terminals thereto. In one aspect, a method includes receiving a configuration for a group of access points operating within a network, the configuration allowing each access point of the group to operate in a super cell mode over a shared frequency channel and a standalone mode over a non-shared frequency channel. The method further includes determining, for an end terminal, whether the end terminal is to connect to the network over the shared frequency channel or the non-shared frequency channel based on a network policy to yield a determination; and controlling connectivity of the end terminal to at least one access point of the group of access points over the shared frequency channel or the non-shared frequency channel based on the determination.

20 Claims, 7 Drawing Sheets

(51) Int. Cl.
*H04W 76/10* (2018.01)
*H04W 84/12* (2009.01)
*H04W 88/10* (2009.01)

(56) References Cited

U.S. PATENT DOCUMENTS

| | | |
|---|---|---|
| 2013/0148609 A1 | 6/2013 | Ram et al. |
| 2018/0152951 A1* | 5/2018 | Zhuang ................. H04W 16/02 |
| 2018/0167993 A1 | 6/2018 | Thakkar et al. |
| 2020/0162328 A1* | 5/2020 | Valenza .............. H04L 41/0806 |
| 2021/0258860 A1* | 8/2021 | Cariou .............. H04W 72/0453 |
| 2021/0368422 A1 | 11/2021 | Ko et al. |
| 2021/0385779 A1 | 12/2021 | Oteri et al. |
| 2022/0116990 A1* | 4/2022 | Cariou .................. H04W 76/27 |
| 2022/0232551 A1* | 7/2022 | Silverman ............... H04W 4/80 |

* cited by examiner

DUAL MODE WI-FI OPERATION IN SHARED AND NON-SHARED CHANNELS

CROSS-REFERENCE TO RELATED APPLICATIONS

This application claims priority to U.S. Provisional Patent Application No. 63/338,966, filed on May 6, 2022, the content of which is incorporated herein by reference in its entirety.

TECHNICAL FIELD

The present disclosure relates to communication systems, and in particular, to systems and methods for simultaneous operation of Wi-Fi access points in a super cell mode and a standalone mode and controlling connectivity of end terminals to the access points in the super cell mode and/or standalone mode based on network policy and conditions.

BACKGROUND

Wi-Fi access in a standalone mode is the predominant configuration currently implemented. In the standalone mode, each access point operates in its own set of frequencies, ensuring there is no overlap with the frequencies in use by the other adjacent access points. This mode of Wi-Fi operation is not able to support mission critical use-cases. Most noted are the cases where roaming fails or takes a longer time than what is needed for the application. For this reason, Wi-Fi is not deployed in industrial or factory environments where the expectation is to have zero roaming failures.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are therefore not to be considered to be limiting of its scope, the principles herein are described and explained with additional specificity and detail through the use of the accompanying drawings in which.

DETAILED DESCRIPTION

Figure 1:
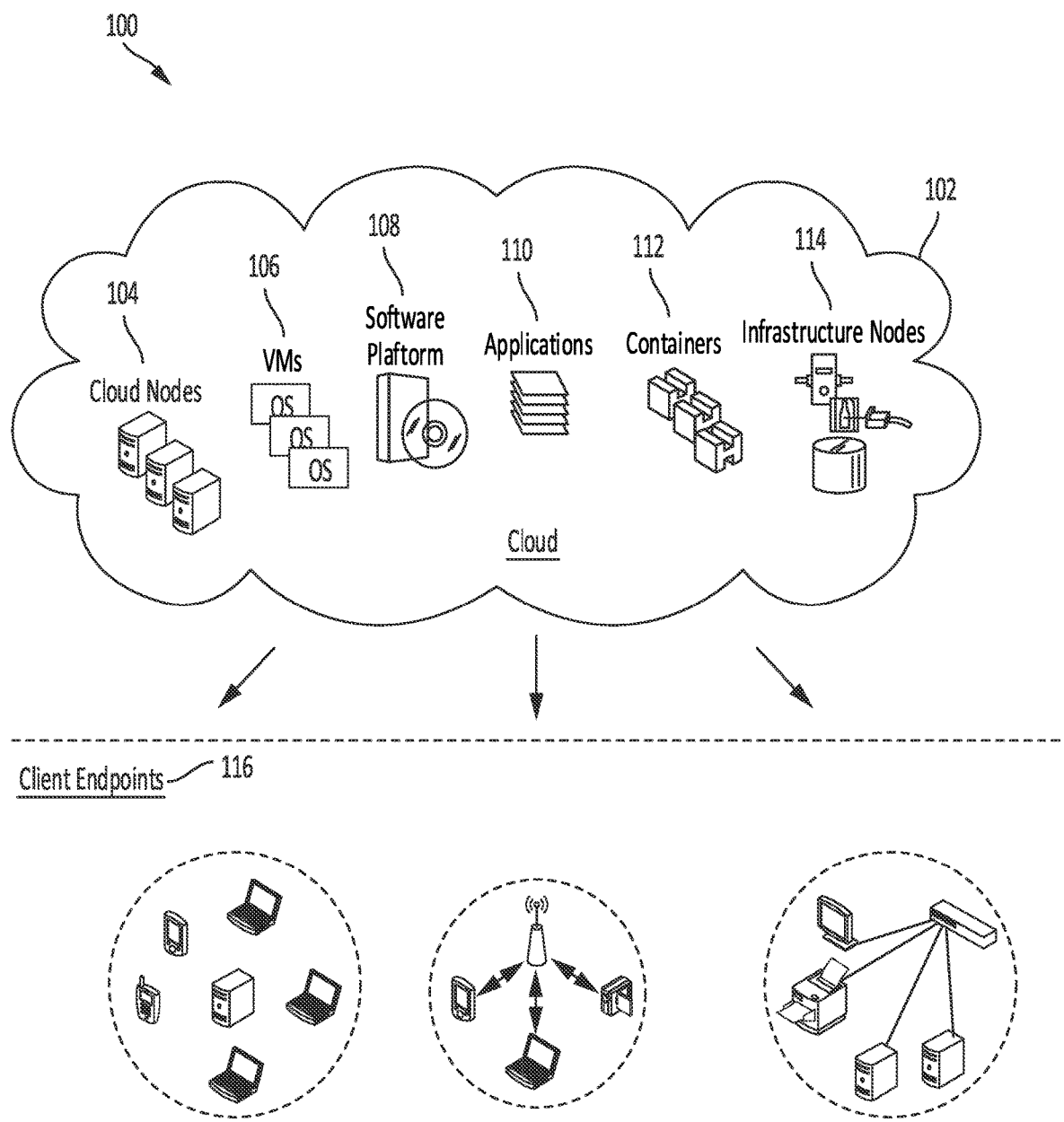
FIG. 1 illustrates an example cloud computing architecture, according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the example embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Systems, methods, and computer-readable media are disclosed for enabling dual mode operation of access points in a Wi-Fi network to provide Wi-Fi connectivity to end terminals. Dual-mode operation include each access point simultaneously operating in a super cell mode and a standalone mode. In a super cell mode, all access points (e.g., within the group of access points configured as such) operate over a shared frequency channel thus creating a large cell in which connected end terminals can send and receive data to any such access point without having to switch access points and/or operating frequencies when moving around in a physical location. In the standalone mode, each access point (that is also configured to operate in a super cell mode) operates over a unique non-shared frequency channel. Based on various network and enterprise-based policies and network conditions, connected end terminals may be directed to connect to the Wi-Fi network in the super cell mode (e.g., over the shared frequency channel) or in the standalone mode (over a unique non-shared frequency channel for a corresponding access point). Network and enterprise-based conditions may include, but are not limited to, device type, application type, access point load conditions, radio frequency conditions and signal strengths, roaming failures, and end terminal density, etc.

In one aspect, a method includes receiving, at a network controller, a configuration for a group of access points operating within a network, the configuration allowing each access point of the group to operate in a super cell mode over a shared frequency channel and a standalone mode over a non-shared frequency channel, each access point operating over a unique non-shared frequency relative to one or more adjacent access points in the network. The method further includes determining, for an end terminal, whether the end terminal is to connect to the network over the shared frequency channel or the non-shared frequency channel based on a network policy to yield a determination; and controlling connectivity of the end terminal to at least one access point of the group of access points over the shared frequency channel or the non-shared frequency channel based on the determination.

In another aspect, the configuration includes a Service Set Identifier (S SID) with which each access point in the group is configured to operate in both the super cell mode and the standalone mode.

In another aspect, the network policy specifies a connection mode for each type of end terminal connected to the network, the connection mode being one of the super cell mode or the standalone mode.

In another aspect, determining whether the end terminal is to connect to the network over the shared frequency channel or the non-shared frequency channel is based on a type of the end terminal.

In another aspect, the network policy specifies a connection mode for each type of end terminal connected to the network based on a physical location of a respective end terminal relative to a coverage area of an access point to which the respective end terminal is connected.

In another aspect, the network policy specifies a connection mode for each type of application utilized on end terminals connected to the network, the connection mode being one of the super cell mode or the standalone mode.

In another aspect, determining whether the end terminal is to connect to the network over the shared frequency channel or the non-shared frequency channel is based on a type of an application currently in use on the end terminal.

In another aspect, the network policy specifies network conditions based on which operation of the end terminal in the super cell mode or the standalone mode is adjusted.

In another aspect, the network is a Wi-Fi network, the network controller is a Wireless Local Area Network Controller (WLC), the network controller receives the configuration from an enterprise Digital Network Architecture Controller (DNAC); and the network controller is communicatively coupled to the group of access points.

In one aspect, a network controller includes one or more memories having computer-readable instructions stored therein and one or more processors. The one or more processors are configured to execute the computer-readable instructions to receive a configuration for a group of access points operating within a network, the configuration allowing each access point of the group to operate in a super cell mode over a shared frequency channel and a standalone mode over a non-shared frequency channel, each access point operating over a unique non-shared frequency relative to one or more adjacent access points in the network, determine, for an end terminal, whether the end terminal is to connect to the network over the shared frequency channel or the non-shared frequency channel based on a network policy to yield a determination, and control connectivity of the end terminal to at least one access point of the group of access points over the shared frequency channel or the non-shared frequency channel based on the determination.

In one aspect, one or more non-transitory computer-readable media include computer-readable instructions, which when executed by one or more processors of a network controller, cause the network controller to receive a configuration for a group of access points operating within a network, the configuration allowing each access point of the group to operate in a super cell mode over a shared frequency channel and a standalone mode over a non-shared frequency channel, each access point operating over a unique non-shared frequency relative to one or more adjacent access points in the network, determine, for an end terminal, whether the end terminal is to connect to the network over the shared frequency channel or the non-shared frequency channel based on a network policy to yield a determination, and control connectivity of the end terminal to at least one access point of the group of access points over the shared frequency channel or the non-shared frequency channel based on the determination.

Example Embodiments

As noted above, Wi-Fi access in a standalone mode is the predominant configuration currently implemented that can provide Wi-Fi connectivity to connected end terminals (e.g., user devices). In the standalone mode, each access point (AP) operates in its own set of frequencies, ensuring there is no overlap with the frequencies in use by the other adjacent APs. This mode of Wi-Fi operation is not able to support mission critical use-cases. The primary reasons are related to handover latency and reliability. Though Institute of Electrical and Electronics Engineers (IEEE) extensions 802.11r in conjunction with 802.11k specification provide some level of optimization for the handover latency, Wi-Fi access in this mode still does not provide the level of reliability that is required for loss-sensitive applications. More specifically, there is high handover latency resulting in packet losses during inter-AP handovers. Moreover, there is no redundancy built into the system. For example, when radio frequency (RF) conditions for reaching a given AP deteriorate, there are no alternative redundant paths for avoiding packet losses. For this reason, Wi-Fi is not deployed in industrial or factory environments where the expectation is to have near-zero or zero roaming failures.

As a practical example, a voice over Wi-Fi call experience, in the standalone mode, is significantly worse than a similar experience on cellular access with IP Multimedia Subsystem (IMS) call. Issues related to Pairwise Master Key (PMK) caching, end terminal neighbor list exhaustion, and end terminal feature incompatibility can add anywhere from 40 msec to 5 seconds of interruption to voice over Wi-Fi calls. This classic mode is not able to meet the requirements of applications that require higher levels of reliability. Accordingly, Wi-Fi is not deployed in industrial or factory environments where the requirement is to have near zero packet loss, zero roaming failures, and high reliability.

Wi-Fi access in a super cell mode is one where multiple APs operate in the same set of frequencies allowing every AP within the RF-reach of the client to receive the packets sent by the client and thereby provide a level of reliability (e.g., for mission critical devices requiring very little to zero discontinuity in service such as robotics and Internet of Things (IoT) devices at a factory floor or more generally in industrial settings).

In a super cell mode, all APs that are part of the super cell are serving one or more end terminals at any given point of time. A transmitted frame from an end terminal will be received by all of the APs in the RF reachability range. This provides some level of reliability and service continuity that may be required for different or a class of connected end terminals such as IoT devices. Operation in a super cell mode also eliminates the need for an end terminal to perform handovers as it moves around. In other words, roaming events in a super cell mode become obsolete. This mode of operation is useful in industrial applications such as in a factory automation scenarios where Ultra-Reliable Low Latency Communication (URLLC) type service is a baseline requirement. However, super cell configuration comes at a huge cost. Essentially the capacity of a super cell (encompassing multiple APs) reduces to the capacity of a single AP.

In view of the above, the present disclosure provides a hybrid solution that addresses the deficiencies of Wi-Fi operation in either a standalone mode or a super cell mode described above. This solution includes configuring APs to simultaneously operate in super cell and standalone modes using shared frequency channels and unique non-shared frequency channels, with network and enterprise-level intelligence and policies being used to directed connected end terminals to communicate with any given AP or a group of APs over the shared frequency channel and/or the non-shared frequency channels.

Figure 2:
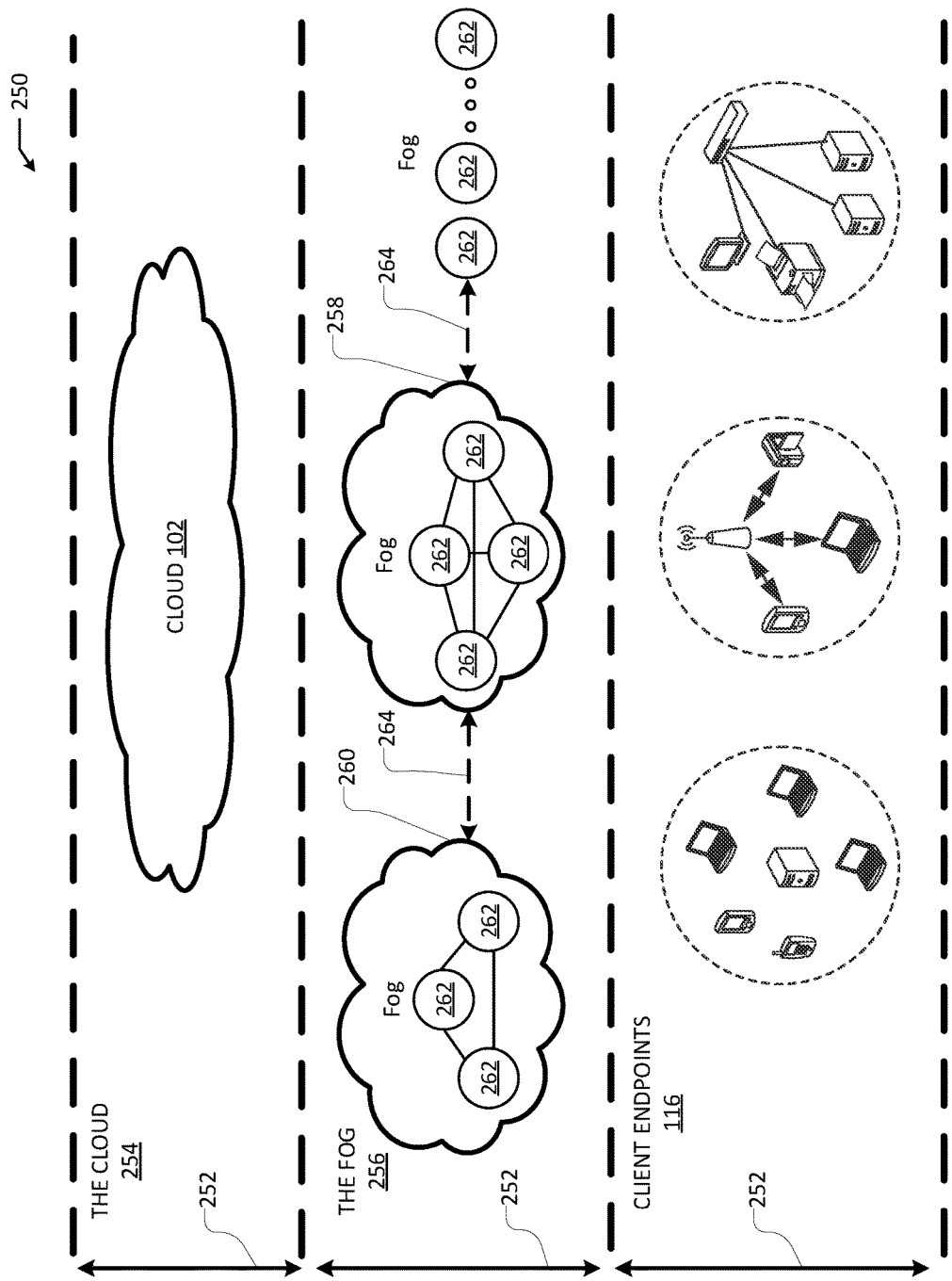
FIG. 2 illustrates an example fog computing architecture, according to some aspects of the present disclosure.

A description of example network environments and architectures for network data access and services, as illustrated in FIGS. 1 and 2, are described first. An example enterprise environment with deployed Wi-Fi operation in shared and non-shared channels, is described with reference to FIG. 3. An example call flow between various components of example enterprise environment of FIG. 3 using APs configured for dual mode Wi-Fi operation, is described with reference to FIG. 4. A description of an example method of dual mode operation of Wi-Fi access points in shared and non-shared channels follows with reference to FIG. 5. The discussion then concludes with a brief description of example devices with reference to FIGS. 6 and 7.

FIG. 1 illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 2 illustrates a diagram of an example fog computing architecture 250. The fog computing architecture 250 can include the cloud layer 254, which includes the cloud 102 of FIG. 1 and any other cloud system or environment, and the fog layer 256, which includes fog nodes 262. The client endpoints 116 (same as in FIG. 1) can communicate with the cloud layer 254 and/or the fog layer 256. The architecture 250 can include one or more communication links 252 between the cloud layer 254, the fog layer 256, and the client endpoints 116. Communications can flow up to the cloud layer 154 and/or down to the client endpoints 116.

The fog layer 256 or "the fog" provides the computation, storage and networking capabilities of traditional cloud networks, but closer to the endpoints. The fog can thus extend the cloud 102 to be closer to the client endpoints 216. The fog nodes 262 can be the physical implementation of fog networks. Moreover, the fog nodes 262 can provide local or regional services and/or connectivity to the client endpoints 116. As a result, traffic and/or data can be offloaded from the cloud 102 to the fog layer 256 (e.g., via fog nodes 262). The fog layer 256 can thus provide faster services and/or connectivity to the client endpoints 116, with lower latency, as well as other advantages such as security benefits from keeping the data inside the local or regional network(s).

The fog nodes 262 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 262 can be deployed within fog instances 258, 260. The fog instances 258, 258 can be local or regional clouds or networks. For example, the fog instances 256, 258 can be a regional cloud or data center, a local area network, a network of fog nodes 262, etc. In some configurations, one or more fog nodes 262 can be deployed within a network, or as standalone or individual nodes, for example. Moreover, one or more of the fog nodes 262 can be interconnected with each other via links 264 in various topologies, including star, ring, mesh or hierarchical arrangements, for example.

In some cases, one or more fog nodes 262 can be mobile fog nodes. The mobile fog nodes can move to different geographical locations, logical locations or networks, and/or fog instances while maintaining connectivity with the cloud layer 254 and/or the endpoints 116. For example, a particular fog node can be placed in a vehicle, such as an aircraft or train, which can travel from one geographical location and/or logical location to a different geographical location and/or logical location. In this example, the particular fog node may connect to a particular physical and/or logical connection point with the cloud 254 while located at the starting location and switch to a different physical and/or logical connection point with the cloud 254 while located at the destination location. The particular fog node can thus move within particular clouds and/or fog instances and, therefore, serve endpoints from different locations at different times.

Figure 3:
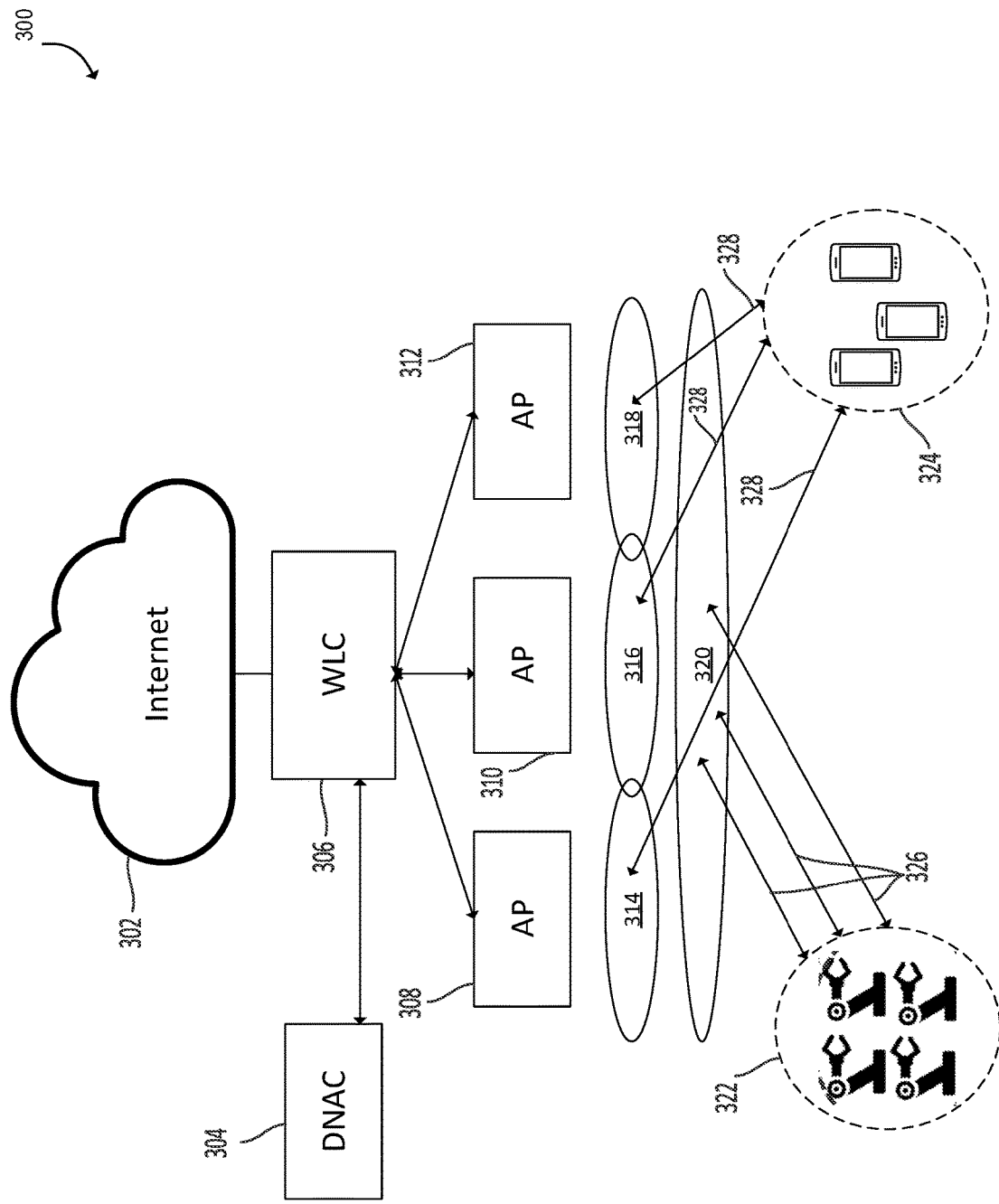
FIG. 3 illustrates an example enterprise environment with deployed Wi-Fi operation in shared and non-shared channels, according to some aspects of the present disclosure.

FIG. 3 illustrates an example local network with deployed Wi-Fi operation in shared and non-shared channels, according to some aspects of the present disclosure. Local network 300 may be deployed at a site or a branch of an enterprise associated with cloud architecture 100 of FIG. 1 and/or fog architecture 200 of FIG. 2. In other words, an enterprise may control and implement cloud architecture 100 and/or fog architecture 200 to provide network connectivity and access at its various sites and locations. Local network 300 may be implemented at one such location or branch providing Wi-Fi access to end terminals (e.g., client endpoints 116 described with reference to FIGS. 1 and 2, which may also be referred to as user devices, UEs, and/or end terminals).

Using local network 300, various connected end terminals may be given access to internet 302 (e.g., to various public, private, and/or hybrid destinations accessible over the internet or to other cloud-based components, services, and applications specific to the enterprise associated with cloud architecture 100 and/or fog architecture 200). Digital Network Architecture Controller (DNAC) 304 may a cloud-based component through which all aspects of operation of the enterprise network across all sites and branches may be managed and controlled including specifying network policies, security policies, etc.

Wireless Local Area Network Controller (WLC) 306 may be located at the same site or branch associated with local network 300, serving as a gateway for all APs (e.g., APs 308, 310, and 312) to access Internet 302, DNAC 304, and/or any other enterprise specific destination or otherwise permitted accessible destinations on Internet 302. Through WLC 306, DNAC 304 may implement configurations of APs 308, 310, and/or 312, modify such configurations, control network access by connected end terminals, push network access and security policies for implementation, etc. While FIG. 3 illustrates only three APs 308, 310, and 312, the present disclosure is not limited thereto and environment 300 may include more or fewer APs. APs 308, 310, and 312 may be any type of known or to be developed access point capable of and configured to provide Wi-Fi access to end terminals and devices connected thereto.

In one example, DNAC 304 may specify configurations for APs 308, 310, and 312 to enable dual mode operation of these APs in a super cell mode and a standalone mode. This configuration will be described further below with reference to FIGS. 4 and 5. As a non-limiting example and once configured by DNAC 304, AP 308 may operate in standalone mode over a unique non-shared frequency channel 314 and a shared frequency channel 320 (e.g., channels 36, 40, 44, and or 48 over 5 GHz bandwidth). AP 310 may operate in standalone mode over a unique non-shared frequency channel 316 and a shared frequency channel 320. AP 312 may operate in standalone mode over a unique non-shared frequency channel 318 and a shared frequency channel 320. In one example, each of the unique non-shared frequency channels 314, 316, and or 318 can be one of channels 99, 107, or 115 over the 6 GHz bandwidth. It should be noted that example channels and frequency bands provided are non-limiting and for illustrative purposes only. Other channels or multiple channels in the same bandwidths and/or other bandwidths may also be used for the shared frequency channel and unique non-shared frequency channels.

It should be noted that while a non-shared frequency channel over which an instant AP (e.g., any one of APs 308, 310, and/or 312) may operate in a standalone mode is referred to as being unique, such uniqueness may be defined as being a different frequency than any AP adjacent to the instant AP. For example, the non-shared frequency channel over which AP 310 operates is unique (different) than the non-shared frequency channel over which APs 308 and 312 operate because AP 308 is adjacent to AP 310 and AP 312 is also adjacent to AP 310. However, in some examples, there may be several (e.g., ten APs) covering a factory floor for example. In such instance, many APs may not necessarily be adjacent to one another. Accordingly, any two non-adjacent APs may operate using the same non-shared frequency channel. Two adjacent APs may be defined as two APs with adjacent coverage area (adjacent cells).

FIG. 3 also shows two example and non-limiting class of devices, namely, IoT devices 322 and mobile devices 324. IoT devices 322 and mobile devices 324. IoT devices 322 are exemplary end terminals requiring URLLC services with almost zero room for service discontinuity. For example, these devices can be robots on a factory floor, various types of sensors on a factory floor, in an oil field or refinery, in a data center, etc. Because these devices require near zero or zero service disruption, they may communicate with any one of APs 308, 310, and/or 312 in the super cell mode and over shared frequency channel 320 using wireless connection 326.

Mobile devices 324 are exemplary end terminals that may not require URLLC services. Hence, mobile devices 324 may communicate with any one of APs 308, 310, or 312 in a standalone mode over the respective one of unique non-shared channels 314, 316, or 318 (depending on which APs they are in coverage area of) using wireless connections 328. As stated above, communication of an end terminal with an AP in the standalone mode may trigger handovers when the end terminal moves from the coverage area of one AP to another. For example, a mobile device 324 that may currently be connected to AP 308 over non-shared channel 314 may roam and switch to communicating with AP 312 over non-shared channel 318, triggering a handoff and a change of frequency channels. While not shown in FIG. 3, other classes of devices (e.g., laptops, tablets, etc.) are also contemplated and within the scope of the present disclosure.

Figure 4:
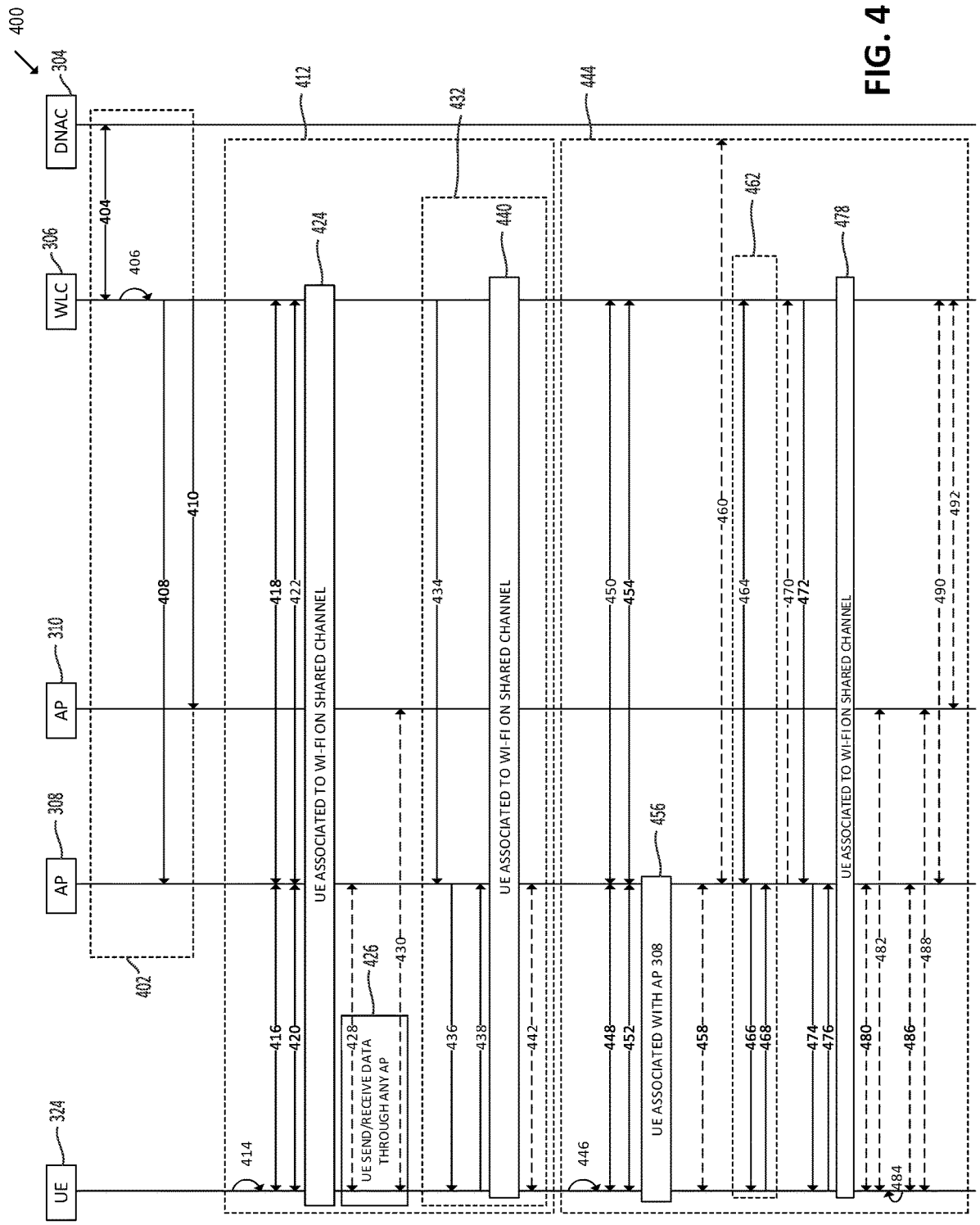
FIG. 4 illustrates an example call flow between various components of example enterprise environment of FIG. 3, according to some aspects of the present disclosure.

FIG. 4 illustrates an example call flow between various components of example enterprise environment of FIG. 3, according to some aspects of the present disclosure. FIG. 4 will be described with reference to some of the components of local network 300 of FIG. 3 including DNAC 304, WLC 306, AP 308, AP 310, and UE 324. While UE 324 is used as an example end terminal in describing FIG. 4, instead an IoT device from among IoT devices 322 and/or any other known or to be developed end terminal capable of establishing a Wi-Fi connection to one or more of AP 308 and AP 310 may be used.

In example call flow 400 of FIG. 4, a number of different scenarios that may occur are described. Scenario 402 is concerned with configuring available APs (e.g., AP 308 and AP 310) for dual-mode Wi-Fi operation in super cell and standalone modes.

At step 404, using DNAC 304, AP 308 and AP 310 may be configured. In one example, DNAC 304 may have a user portal accessible to an enterprise's network operator through which the APs may be configured and corresponding specifications provided. For example, each of AP 308 and AP 310 may be configured with two radios, namely, AP radio-0 and AP radio 1. AP radio-0 may be specified to operate in a shared frequency channel (super cell mode) while AP radio-1 may be specified to operate in a unique non-shared frequency channel. In one example, the shared and non-shared frequency channels may be in the same or different frequency bands (e.g., 2.4 GHz, 5 GHz, 6 GHz, etc.). Once the configurations are specified, they are pushed to (or alternatively queried by) WLC 306.

At step 406, WLC 306 enables a coordination function for multi-AP coordination and UE key management for super cell mode.

At step 408, WLC 306 configures AP 308 for dual mode operation. More specifically, WLC 306 may enable radio-0 on AP 308 to operate in super cell mode (e.g., channel X) and radio-1 on AP 308 to operate in the standalone mode (e.g., channel Y).

Similarly, at step 410, WLC 306 configures AP 310 for dual mode operation. More specifically, WLC 306 may enable radio-0 on AP 310 to operate in super cell mode (e.g., channel X) and radio-1 on AP 310 to operate in the standalone mode (e.g., channel Y)

Once the APs are configured, each one of AP 308 and AP 310 may broadcast a radio-0 beacon to end terminals indicating their support for a super cell mode and similarly may broadcast a radio-1 beacon indicating support for standalone mode. Basic Service Identifier (BSSID) of APs 308 and 310 may be the same. In other words, the same BSSID may be used by any AP in the network that is configured to operate in the super cell mode and the standalone mode simultaneously (some APs with the same SSID may operate in the standalone mode over the unique non-shared frequency while some other APs with the same SSID may operate over the shared frequency in the super cell mode).

Once AP configuration is completed in scenario 402, the next scenario 412 may occur where an end terminal (e.g., UE 324) randomly associates itself with AP 308 or AP 310 over the shared frequency channel of the super cell mode. In one example, once UE 324 is in the coverage area of AP 308 and 310, it may receive and pick up beacons broadcasted by AP 308 or AP 310 for their respective radio-0 and radio-1 and may randomly select one to associate with.

Therefore, at step 414, UE 324 randomly selects the shared frequency channel (e.g., channel 36 in the 5 GHz band) to connect to AP 308 over. At step 416, the required registration of UE 324 for connecting to AP 308 may occur between UE 324 and AP 308. At the same time, step 418 may occur between AP 308 and WLC 306, where AP 308 may share with WLC the association and identifier of UE 324 received from UE 324 at step 414.

At steps 420 and 422, an authentication process for authenticating UE 324 may be completed between UE 324 and AP 308 (step 420) and between AP 310 and WLC 306 (step 422). For example, this authentication can be based on IEEE 802.1x protocol for Wi-Fi connection and/or any other known or to be developed protocol for establishing a connection between UE 324 and AP 308.

At step 424 and pursuant to a successful authentication, UE 324 is associated with (connected to) Wi-Fi network (local network 300) over the shared frequency channel of the super cell mode.

Because UE 324 is connected to the Wi-Fi network over the shared frequency channel, at step 426, UE 324 may send and receive data to AP 308 and/or AP 310 since both APs are configured to operate in the super cell mode. In other words, UE 324 may freely move around the physical area in which APs 308 and 310 are operational and seamlessly exchange data with any one of APs 308 and 310 without having to complete a handover process (which can cause disruption in service). This exchange of data with AP 308 or AP 310 are shown as steps 428 and 430, respectively.

As noted above, the present disclosure enables WLC 306 to utilize network intelligence including network policy and network conditions to control connectivity of end terminals such as UE 324 over the shared frequency channel to all APs configured to operate in the super cell mode or over a unique non-shared frequency channel to any one of those APs also configured to operate in the standalone mode.

Example scenario 412 is one where UE 324 randomly associates with the shared frequency channel. Once Wi-Fi connection is established over the shared frequency channel as described, WLC 306 may determine that UE 324 should utilize a non-shared frequency channel to connect to one of APs 308 or 310 in the standalone mode. In one example, WLC 306 may make that determination based on the device type of UE 324, a type of application used on UE 324, and/or network policies set by an operator using DNAC 304. For example, an enterprise operator may specify that all IoT devices (e.g., cellular phones) are to operate over the shared frequency channel in the super cell mode or that all UEs should operate over a unique non-shared frequency channel. In another example, the enterprise operator may specify that all IoT devices should operate over the shared frequency channel unless the network load condition exceeds a load threshold and/or RF conditions drop below a signal strength threshold. Network load condition and signal strength conditions may be configurable parameters determined based on experiments and/or empirical studies.

In example scenario 412 described above, UE 324 may be an IoT device that established Wi-Fi connection over the shared frequency channel per set network policies. WLC 306, upon determining that the network load condition exceeds the load condition threshold and/or RF conditions drop below the signal strength threshold, may direct APs 308 and 310 to switch UE 324 over to a non-shared frequency channel.

In another example, such network policy may be application based such that connections for using specific applications (e.g., voice over IP) should be established over the shared frequency channel while a connection for other applications (e.g., accounting application or time entry application) should be established over a unique non-shared frequency of the AP that UE 324 is in the footprint of (vicinity of). In this example, when UE 324 establishes a connection over the shared frequency channel as described above, UE 324 may be using an application that should utilize the shared frequency channel (e.g., voice over IP). However, as soon as UE 324 switches the application to one that should utilize a unique non-shared frequency channel (e.g., a time entry application), WLC 306 may direct APs 308 and 310 to switch UEs connection over to a non-shared frequency channel.

Scenario 432 is an example where WLC 306 determines that UE 324 should switch to a unique non-shared frequency channel. At step 434, WLC 306 may send a message to AP 308 directing AP 308 to switch UE 324 from connecting to AP 308 on the shared frequency channel to a unique non-shared frequency channel on radio-1 of AP 308. The reason that WLC 306 may send this message to AP 308 is that UE 324 is currently in vicinity of and connected to AP 308. If connected to AP 310, WLC 306 may send the same message to AP 310.

At step 436, AP 308 may send a BSS Transition Message (BTM) to UE 324 with the unique non-shared frequency channel that AP 308 is configured to operate on in the standalone mode.

Using the information including in the BTM, at step 438, UE 324 associates itself with (connects to) AP 308 over radio-1 and the unique non-shared frequency channel of AP 308 (e.g., channel 99 of the 6 GHz band). Accordingly, at step 440, UE 324 has established Wi-Fi connected to AP 308 over the unique non-shared frequency channel of AP 308 in the standalone mode. Using this non-shared frequency channel, UE 324 may send and receive data to and from AP 308 at step 442.

In another example, as exemplified by scenario 444, instead of randomly associating with shared channel per scenario 412, UE 324 may randomly attach to a unique non-shared frequency channel of AP 308 or AP 310 (e.g., channel 107 in the 6 GHz band).

In doing so, at step 446, UE 324 randomly associates itself with (connects to) AP 308 over radio-1 and the unique non-shared frequency channel of AP 308 (e.g., channel 99 of the 6 GHz band). Alternatively, UE 324 randomly associates itself with (connects to) AP 310 over radio-1 and the unique non-shared frequency channel of AP 310 (e.g., channel 107 in the 6 GHz band). For sake of brevity, it is assumed that in scenario 444, UE 324 randomly selects the unique non-shared frequency of AP 308 to connect to.

At step 448, the required registration of UE 324 for connecting to AP 308 may occur between UE 324 and AP 308. At the same time, step 450 may occur between AP 308 and WLC 306, where AP 308 may share with WLC the association and identifier of UE 324 received from UE 324 at step 448.

At steps 452 and 454, an authentication process for authenticating UE 324 may be completed between UE 324 and AP 308 (step 452) and between AP 310 and WLC 306 (step 454). For example, this authentication can be based on IEEE 802.1x protocol for Wi-Fi connection and/or any other known or to be developed protocol for establishing a connection between UE 324 and AP 308.

At step 456 and pursuant to a successful authentication, UE 324 is associated with (connected to) Wi-Fi network (local network 300) via AP 308 over the unique shared frequency channel of AP 308 in the standalone mode. At step 458, UE 324 send and/or receive data to and/or from AP 308.

In turn, at step 460, AP 308 can send and/or receive data from UE 324 or destined for UE 324 to and from WLC 306.

In one example and after UE 324 is associated with AP 308 in the standalone mode, WLC 306 may determine that UE 324 should be moved to a shared frequency channel and communicate with AP 308 and/or AP 310 in the super cell mode. As indicated above, WLC 306 may trigger this transition to a shared frequency channel based on network policies (e.g., device type, application-type, and/or network conditions, etc.).

Therefore, at step 464, WLC 306 may direct AP 308 to switch UE 324 from its unique non-shared frequency channel to the shared frequency channel. In response, at step 466, AP 308 may send a BTM to UE 324 with the shared frequency channel that AP 308 is configured to operate on in the super cell mode. At step 468, UE 324 switches to the shared frequency channel and communicates with AP 308 (and possibly AP 310) over the shared frequency channel in the super cell mode.

Notwithstanding scenario 462 and while UE 324 is communicating with AP 308 over the unique non-shared frequency channel, another possible trigger may occur for switching UE 324 from the unique non-shared frequency channel to the shared frequency channel. In one example, AP 308 may either be provided with (e.g., via WLC 306) or may over time monitor and learn various network operation parameters (e.g., RF metrics, roaming failure when UE 324 attempts to switch from AP 308 to AP 310 in the standalone mode, interference, etc.). AP 308 may provide such information to WLC 306 at step 470. Alternatively, step 470 may be skipped and WLC 306, on its own, may monitor and determine network operation parameters. Based on the network operation parameters (e.g., RF signal strengths not meeting a minimum requirement, signal strength of interfering signals from adjacent channels being greater than a threshold, roaming failure events, etc.), WLC 306 may determine that UE 324 should switch from operating on the unique non-shared frequency channel of AP 308 to the shared frequency channel.

Thereafter, steps 472, 474, and 476 may occur in order. Steps 472, 474, and 476 may be the same as steps 464, 466, and 468, respectively, and hence will not be described further for sake of brevity.

Accordingly, at step 478, UE 324 is associated with (connected to) Wi-Fi network (local network 300) over the shared frequency channel of the super cell mode and may send/receive data to/from AP 308 and/or AP 310 over the shared frequency channel as shown by steps 480 and 482.

Being configured to operate on the shared frequency channel, at step 484, UE 324 roams around (e.g., at a factory floor or more generally the physical location at which network 300 is installed and operational) without associating with any particular AP (either AP 308 or 310) and simply sends/receives data using the shared frequency channel, as shown in steps 486 and 488. Data received at any one of APs 308 and 310 may then be communicated to WLC 306 by the respective one of APs 308 and 310. Similarly, data destined for UE 324 that are received at WLC 306 may be communicated to APs 308 and/or 310 to be sent to UE 324. Steps 490 and 492 refer to the bi-directional communication between WLC 306 and APs 308 and 310, respectively.

Figure 5:
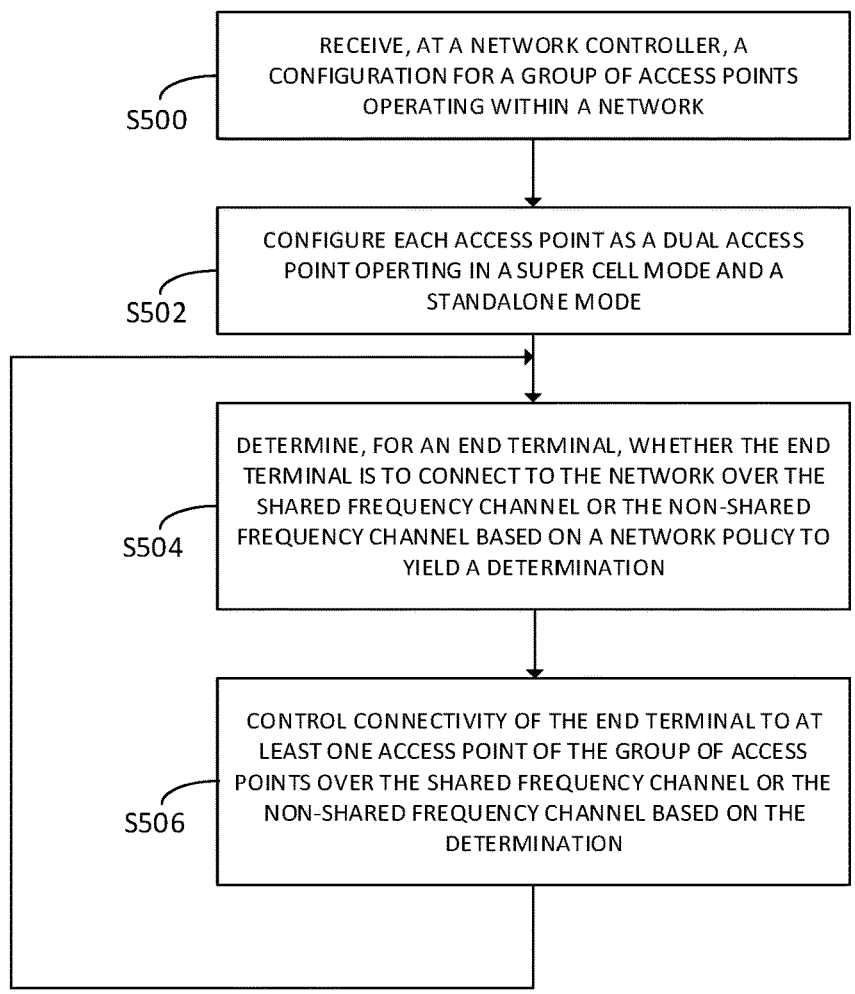
FIG. 5 illustrates an example method of dual mode operation of Wi-Fi access points in shared and non-shared channels, according to some aspects of the present disclosure.

FIG. 5 illustrates an example method of dual mode operation of Wi-Fi access points in shared and non-shared channels, according to some aspects of the present disclosure. FIG. 5 will be described from the perspective of WLC 306 of FIG. 3. It should be understood that WLC 306 may have one or more memories having computer-readable instructions stored therein and one or more processors configured to execute the computer-readable instructions to perform the steps of FIG. 5. FIG. 5 will be described with reference to FIGS. 1-4.

At S500, WLC 306 (a network controller) may receive configurations (configuration parameters) for configuring a group of access points as dual mode access points operating in a super cell mode and a standalone mode in a network (e.g., network 300) that provides Wi-Fi connectivity to connected end terminals (e.g., end terminals 322 and/or 324 of FIG. 3). All access points of the group may operate over a shared frequency channel in the super cell mode and each access point of the group may be configured to operate over a unique non-shared frequency channel relative to one or more adjacent access points in the network while operating in the standalone mode.

An example of a group of access points can be APs 308, 310, and/or 312 of FIGS. 3 and 4. In one example and as described above with reference to step 404 of FIG. 4, configuration parameters for configuring the group of access points as dual mode Wi-Fi access points operating in super cell mode (over a shared frequency channel as described above) and standalone mode (with each access point operating over a unique non-shared frequency channel as described above) simultaneously. WLC 306 may receive the configuration parameters from DNAC 304. As described above, configuration parameters may include a Service Set Identifier (S SID) with which each access point in the group is configured to operate in both the super cell mode and the standalone mode.

At S502, WLC 306 may configure each access point in the group of access points as dual mode access point operating in a super cell mode (over a shared frequency channel) and a standalone mode (over a unique non-shared frequency channel). This process of S502 may be performed as described above with reference to steps 408 and 410 of FIG. 4.

After each access point is configured as a dual mode access point operating in a super cell mode and a standalone mode per S502, at S504, WLC 306 may determine whether each end terminal is to connect to the network (be given Wi-Fi access) over a shared frequency channel or a non-shared frequency channel.

As described with reference to scenarios 412 and 444 of FIG. 4, each configured AP may broadcast a beacon for its radio-0 and radio-1 and an end terminal such as UE 324 may randomly connected to a given AP over the shared frequency channel or a unique non-shared frequency channel. This connection is verified/authenticated by WLC 306 per steps 416, 418, 420, 422 and/or steps 448, 450, 452, and 454 of FIG. 4.

In some examples, if a randomly selected frequency channel by an end terminal is not available (e.g., based on the device type of UE 324, UE 324 may or may not be authorized to connected to an AP over a non-shared frequency channel such as when UE 324 is an IoT device), WLC 306 may reject the requested connection by UE 324 and instead direct AP 308 and/or AP 310 to steer UE 324 to another frequency (e.g., reject a request by UE 324 to connect to AP 308 over the shared frequency channel and instead direct AP 308 to steer UE 324 to connect to AP 308 over the unique non-shared frequency channel with which AP 308 is configured).

In some examples and after an initial connection of an end terminal to the network (e.g., UE 324 connection to AP 308 or AP 310 over a shared frequency channel or a non-shared frequency channel), WLC 306 may determine whether the existing connection should remain or be switched to another channel (i.e., from shared frequency channel to a non-shared frequency channel as described with reference to scenarios 432, 462 and/or steps 470 and 472 of FIG. 4). Such determination can be based on any known or to be configured network policy that may be set by an enterprise network operator (e.g., via DNAC 302 and/or an enterprise policy system such as Authentication, Authorization, and Accounting (AAA) server).

In one instance, the network policy may indicate a connection mode for each type of end terminal connected to the network with the connection mode being one of the super cell mode or the standalone mode. Each type of end terminal may be associated with operation in the super cell mode or the standalone mode when connected to any access point in the group of access points. Accordingly, at S504, WLC 306 may determine whether the end terminal is to operate over the shared frequency channel or a unique non-shared frequency channel based on the type of the end terminal. The type of the end terminal may be determined upon authenticating the end terminal (e.g., UE 324) after the end terminal is attached to the network.

For example, IoT devices can be one type of device that may be defined to operate on (connect to) the Wi-Fi network over the shared frequency channel in the super cell mode, as described above. In another example, cellular phones can be defined as another type of device to operate on (connect to) the Wi-Fi network over a unique non-shared frequency channel in a standalone mode and may roam from one access point to another using a handover process.

In another instance, the network policy may specify a connection mode for each type of application utilized on end terminals connected to the network with the connection mode being one of the super cell mode or the standalone mode. Accordingly, at S504, WLC 306 may determine whether the end terminal is to operate over the shared frequency channel or a unique non-shared frequency channel by determining a type of an application currently in use on the end terminal (e.g., voice over IP or a time entry application, as described above).

For example, if the application in use on UE 324 is a voice over IP and the network policy is set such that voice over IP applications are to utilize the Wi-Fi connection over the shared frequency channel to ensure zero service disruption, then WLC 306 may determine that UE 324 is to connect to the Wi-Fi network over the shared frequency channel in the super cell mode (or switch from currently operating in the standalone mode to the super cell mode). Similarly, if the application in use on UE 324 is a time entry application, WLC 306 may determine that UE 324 is to connect to one of APs 308 or 310 over a unique non-shared frequency channel for that AP in the standalone mode (or switch from currently operating in the super cell mode to the standalone mode).

In another instance, the network policy may specify network conditions based on which operation of the end terminal in the super cell mode or the standalone mode is adjusted. As described above, network conditions can include, RF conditions including RF signal strength, end terminal density, network load conditions, roaming failures, interference from adjacent cells, etc.

In some examples, APs 308, 310, and/or 312 may include Received Signal Strength Indicator (RSSI) RSSI and other RF performance parameters in Control And Provisioning of Wireless Access Points (CAPWAP) headers, in the packets sent to WLC 306. CAPWAP is a protocol used between AP and WLC for carrying control and user plane traffic. An AP, when sending user plane/control plane packets from an end terminal to WLC 306, may include RSSI value detected for that end terminal (e.g., UE 324). This RSSI value is dynamic and can be averaged over a time window (e.g., 20 msecs). This enables WLC 306 to know the AP with the best-RF reach to the end terminal. WLC 306 can then use this information to rank and determine the order of APs for an end terminal to connect to. In some examples, each access point, may designate a set of APs (e.g., AP 308 may designate AP 310 and/or AP 312) as forwarders and provide a priority order in CAPWAP messages.

In another example, whether a UE such as UE 324 operates in the super cell mode or the standalone mode depends on how close to an edge of a cell (coverage area) of a particular AP the UE is. For example, depending on how close UE 324 is to an edge of any of the coverage areas of APs 308, 310 and/or 312, the operation of UE 324 may switch from one in a super cell mode to a standalone mode or vice-versa. In one example, AP 308 and AP 310 may be covering adjacent areas (forming adjacent cells). UE 324 may initially be operating in the standalone mode by connecting to AP 308. As UE 324 moves closer (physically) to the edge of the area covered by AP 308, UE 324 may be directed to switch operation to the super cell mode until UE 324 is well within the coverage area of AP 310. The thresholds for what constitute "close to the edge cell" or "well within the coverage area" may be configurable parameters determined based on experiments and/or empirical studies. Accordingly, a network policy may be defined that specifies conditions for switching mode of operation for UEs depending on whether they are physically close to the edge of coverage area of a particular AP or not. In yet another example, one or more machine learning (trained neural networks) may be deployed that may analyze movement and behavior of UEs and end terminals to predict their movement towards/away from a particular AP, likelihood of remaining within a coverage area of a particular AP, likelihood or frequency of inter-cell movements, etc., which may then be used to set network policies of when to switch operation of an end terminal from the standalone mode to the super cell mode given the end terminal's physical location.

In another example, any combination of the above example network policies may be used as a network policy itself for managing when an end terminal is to operate in a standalone mode or a super cell mode.

Accordingly, at S504, WLC 306 may determine whether a connected end terminal is to connect to the Wi-Fi network over the shared frequency channel or a unique non-shared frequency channel based on the network load conditions. This process may be performed according to steps 434, 464, and/or 470 of FIG. 4.

In another example, WLC 306 may determine whether an end terminal is to connect to the Wi-Fi network over the shared frequency channel in the super cell mode or a unique non-shared frequency channel in a standalone mode, may be based on a combination of the above-described factors (e.g., a weighted combination of device class, application type, and network load conditions).

At S506, WLC 306 may control connectivity of the end terminal (e.g., UE 324) to at least one AP (e.g., AP 308 or 310) over the shared frequency channel or the non-shared frequency channel based on the determination made at S504.

In some examples, S504 and S506 may be periodically repeated until the end terminal disconnects from the Wi-Fi network.

With various examples of dual mode Wi-Fi access described above with reference to FIGS. 1-5, the disclosure next turns to description of system architecture and devices that can be utilized as components of network 300 of FIG. 3 including DNAC 302, WLC 306, APs 308, 310, and 312, devices 322 and 324, and/or any other component of example systems and architectures described with reference to FIGS. 1-5.

Figure 6:
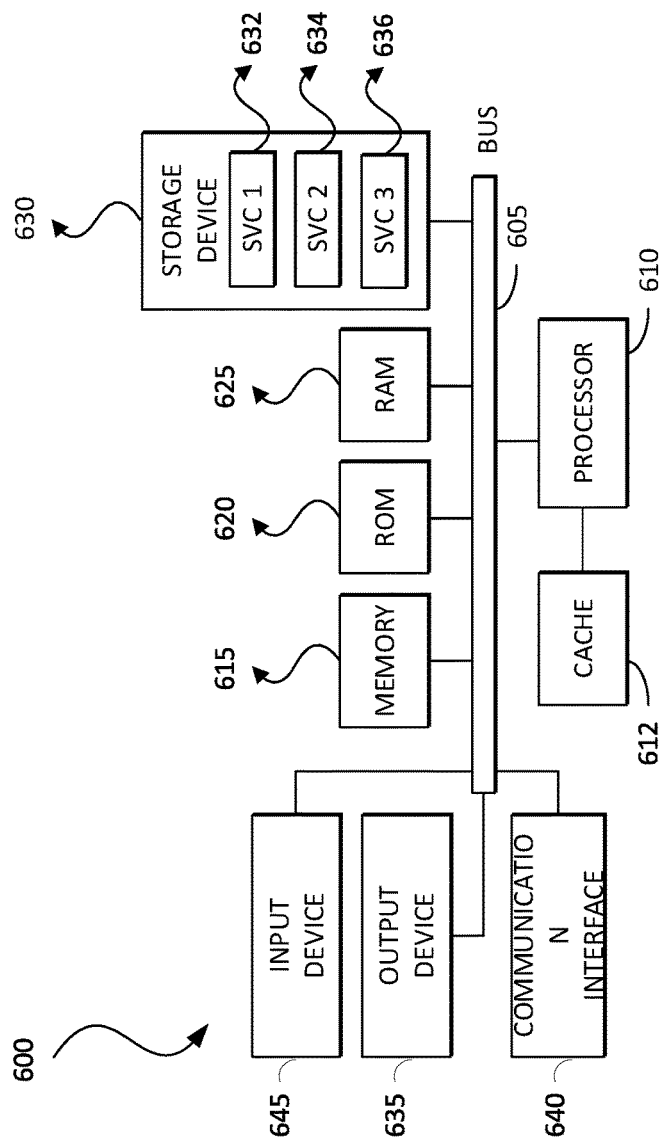
FIG. 6 illustrates an example computing system architecture, according to some aspects of the present disclosure.

FIG. 6 illustrates a computing system architecture, according to some aspects of the present disclosure. Components of computing system architecture 600 are in electrical communication with each other using a connection 605, such as a bus. Exemplary system 600 includes a processing unit (CPU or processor) 610 and a system connection 605 that couples various system components including the system memory 615, such as read only memory (ROM) 620 and random access memory (RAM) 625, to the processor 610. The system 600 can include a cache 612 of high-speed memory connected directly with, in close proximity to, or integrated as part of the processor 610. The system 600 can copy data from the memory 615 and/or the storage device 630 to the cache 612 for quick access by the processor 610. In this way, the cache 612 can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware or software service, such as service (SVC) 1 632, service (SVC) 2 634, and service (SVC) 3 636 stored in storage device 630, configured to control the processor 610 as well as a special-purpose processor where software instructions are incorporated into the actual processor design. The processor 610 may be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include services 632, 634, 636 for controlling the processor 610. Other hardware or software modules are contemplated. The storage device 630 can be connected to the system connection 605. In one aspect, a hardware module that performs a particular function can include the software component stored in a computer-readable medium in connection with the necessary hardware components, such as the processor 610, connection 605, output device 635, and so forth, to carry out the function.

Figure 7:
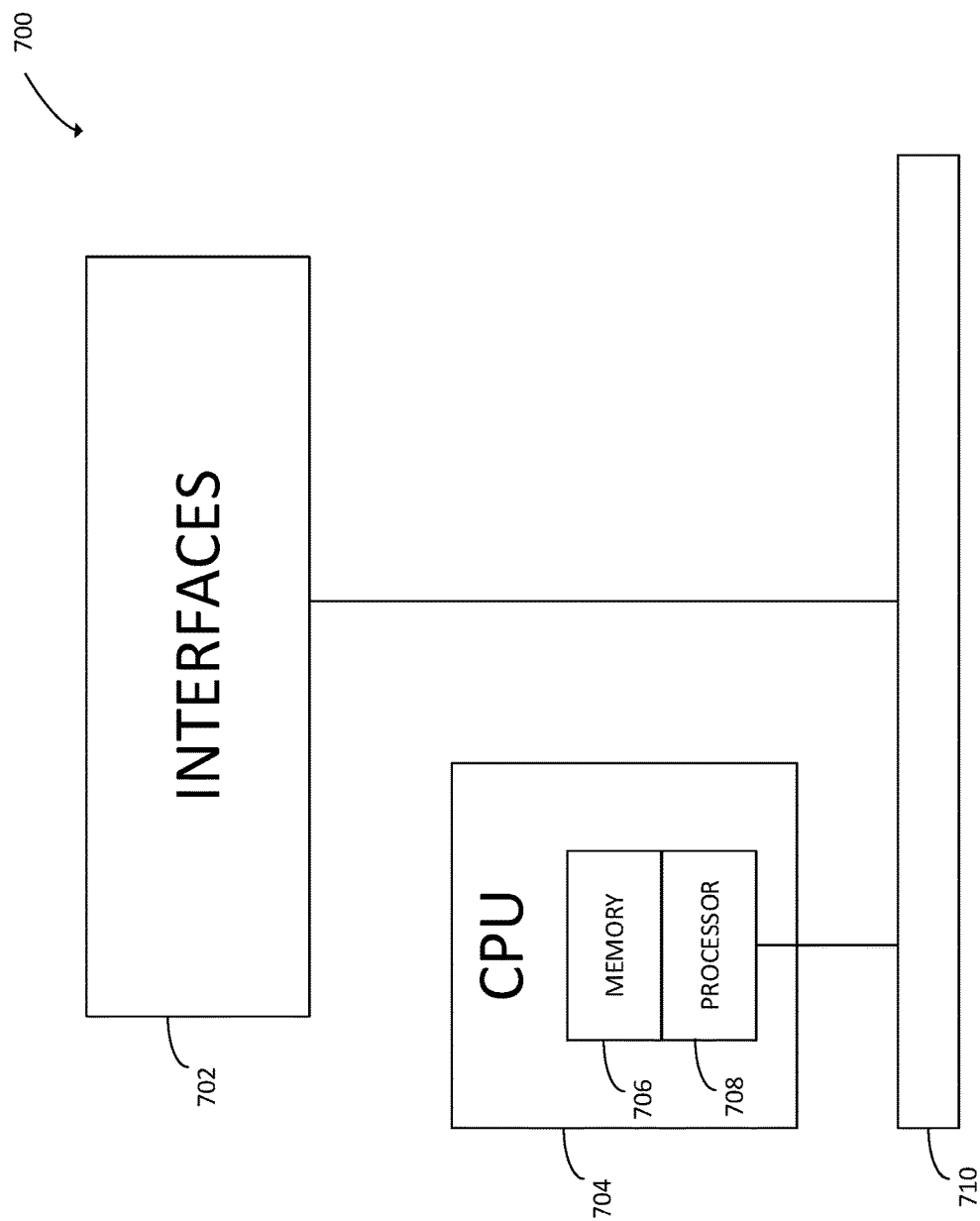
FIG. 7 illustrates an example network device, according to some aspects of the present disclosure

FIG. 7 illustrates an example network device, according to some aspects of the present disclosure. Example network device 700 can be suitable for performing switching, routing, load balancing, and other networking operations. Network device 700 includes a central processing unit (CPU) 704, interfaces 702, and a bus 710 (e.g., a PCI bus). When acting under the control of appropriate software or firmware, the CPU 704 is responsible for executing packet management, error detection, and/or routing functions. The CPU 704 preferably accomplishes all these functions under the control of software including an operating system and any appropriate applications software. CPU 704 may include one or more processors 708, such as a processor from the INTEL X86 family of microprocessors. In some cases, processor 708 can be specially designed hardware for controlling the operations of network device 700. In some cases, a memory 706 (e.g., non-volatile RAM, ROM, etc.) also forms part of CPU 704. However, there are many different ways in which memory could be coupled to the system.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications-intensive tasks, these interfaces allow the master CPU 704 to efficiently perform routing computations, network diagnostics, security functions, etc.

Although the system shown in FIG. 7 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

The network device 700 can also include an application-specific integrated circuit (ASIC), which can be configured to perform routing and/or switching operations. The ASIC can communicate with other components in the network device 700 via the bus 710, to exchange data and signals and coordinate various types of operations by the network device 700, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method, comprising:
receiving, at a network controller, a configuration for a group of access points operating within a network, the configuration allowing each access point of the group to operate simultaneously in a super cell mode over a shared frequency channel and a standalone mode over a non-shared frequency channel to provide connectivity to end terminals in one of the super cell mode or the standalone mode based on a condition, each access point operating over a unique non-shared frequency relative to one or more adjacent access points in the network;
determining, for an end terminal, whether the end terminal is to connect to the network over the shared frequency channel or the non-shared frequency channel based on a network policy that corresponds to the condition, to yield a determination; and
controlling connectivity of the end terminal to at least one access point of the group of access points over the shared frequency channel or the non-shared frequency channel based on the determination.

2. The method of claim 1, wherein the configuration includes a Service Set Identifier (SSID) with which each access point in the group is configured to operate in both the super cell mode and the standalone mode.

3. The method of claim 1, wherein the network policy specifies a connection mode for each type of end terminal connected to the network, the connection mode being one of the super cell mode or the standalone mode.

4. The method of claim 3, wherein determining whether the end terminal is to connect to the network over the shared frequency channel or the non-shared frequency channel is based on a type of the end terminal.

5. The method of claim 1, wherein the network policy specifies a connection mode for each type of end terminal connected to the network based on a physical location of a respective end terminal relative to a coverage area of an access point to which the respective end terminal is connected.

6. The method of claim 1, wherein the network policy specifies a connection mode for each type of application utilized on end terminals connected to the network, the connection mode being one of the super cell mode or the standalone mode.

7. The method of claim 6, wherein determining whether the end terminal is to connect to the network over the shared frequency channel or the non-shared frequency channel is based on a type of an application currently in use on the end terminal.

8. The method of claim 1, wherein the network policy specifies network conditions based on which connectivity of the end terminal to the at least one access point in the super cell mode or the standalone mode is adjusted.

9. The method of claim 1, wherein the network is a Wi-Fi network;
the network controller is a Wireless Local Area Network Controller (WLC);
the network controller receives the configuration from an enterprise Digital Network Architecture Controller (DNAC); and
the network controller is communicatively coupled to the group of access points.

10. A network controller, comprising:
one or more memories having computer-readable instructions stored therein; and
one or more processors configured to execute the computer-readable instructions to:
receive a configuration for a group of access points operating within a network, the configuration allowing each access point of the group to operate simultaneously in a super cell mode over a shared frequency channel and a standalone mode over a non-shared frequency channel to provide connectivity to end terminals in one of the super cell mode or the standalone mode based on a condition, each access point operating over a unique non-shared frequency relative to one or more adjacent access points in the network;
determine, for an end terminal, whether the end terminal is to connect to the network over the shared frequency channel or the non-shared frequency channel based on a network policy that corresponds to the condition, to yield a determination; and
control connectivity of the end terminal to at least one access point of the group of access points over the shared frequency channel or the non-shared frequency channel based on the determination.

11. The network controller of claim 10, wherein the configuration includes a Service Set Identifier (SSID) with which each access point in the group is configured to operate in both the super cell mode and the standalone mode.

12. The network controller of claim 10, wherein the network policy specifies a connection mode for each type of end terminal connected to the network, the connection mode being one of the super cell mode or the standalone mode.

13. The network controller of claim 12, wherein the network controller is configured to determine whether the end terminal is to connect to the network over the shared frequency channel or the non-shared frequency channel is based on a type of the end terminal.

14. The network controller of claim 10, wherein the network policy specifies a connection mode for each type of end terminal connected to the network based on a physical location of a respective end terminal relative to a coverage area of an access point to which the respective end terminal is connected.

15. The network controller of claim 10, wherein the network policy specifies a connection mode for each type of application utilized on end terminals connected to the network, the connection mode being one of the super cell mode or the standalone mode.

16. The network controller of claim 15, wherein network controller is configured to determine whether the end terminal is to connect to the network over the shared frequency channel or the non-shared frequency channel is based on a type of an application currently in use on the end terminal.

17. The network controller of claim 10, wherein the network policy specifies network conditions based on which connectivity of the end terminal to the at least one access point in the super cell mode or the standalone mode is adjusted.

18. The network controller of claim 10, wherein network is a Wi-Fi network and the network controller is a Wireless Local Area Network Controller (WLC).

19. The network controller of claim 10, wherein the network controller is configured to receive the configuration from an enterprise Digital Network Architecture Controller (DNAC).

20. The network controller of claim 10, wherein the network controller is communicatively coupled to the group of access points.

* * * * *